United States Patent
Zielinski

(10) Patent No.: US 8,560,266 B2
(45) Date of Patent: Oct. 15, 2013

(54) TURBOMACHINE, GAP-MEASURING SYSTEM, AND METHOD FOR DETERMINING A ROTOR GAP

(75) Inventor: Michael Zielinski, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 417 days.

(21) Appl. No.: 12/739,720

(22) PCT Filed: Oct. 17, 2008

(86) PCT No.: PCT/DE2008/001700
§ 371 (c)(1),
(2), (4) Date: Apr. 23, 2010

(87) PCT Pub. No.: WO2009/052790
PCT Pub. Date: Apr. 30, 2009

(65) Prior Publication Data
US 2010/0268509 A1 Oct. 21, 2010

(30) Foreign Application Priority Data
Oct. 25, 2007 (DE) .......................... 10 2007 051 027

(51) Int. Cl.
*G01B 7/14* (2006.01)
*G01B 11/14* (2006.01)

(52) U.S. Cl.
USPC ........................................................ 702/158

(58) Field of Classification Search
USPC .......................................................... 702/158
See application file for complete search history.

(56) References Cited

U.S. PATENT DOCUMENTS

| | | | |
|---|---|---|---|
| 4,063,167 A * | 12/1977 | Duly | 324/671 |
| 4,823,071 A * | 4/1989 | Ding et al. | 324/662 |
| 4,950,084 A | 8/1990 | Bailleul et al. | |
| 5,892,365 A | 4/1999 | Bailleul et al. | |
| 6,406,256 B1 * | 6/2002 | Marx | 415/138 |
| 2005/0276688 A1* | 12/2005 | Roth-Fagaraseanu et al. | 415/173.4 |
| 2007/0043497 A1* | 2/2007 | Leogrande et al. | 701/100 |
| 2007/0292260 A1* | 12/2007 | Bagepalli et al. | 415/14 |
| 2009/0319206 A1* | 12/2009 | Russhard et al. | 702/56 |
| 2010/0213929 A1* | 8/2010 | Gregg et al. | 324/207.15 |

FOREIGN PATENT DOCUMENTS

| | | |
|---|---|---|
| DE | 36 17 373 A1 | 11/1987 |
| GB | 2 071 852 A | 9/1981 |
| WO | 02/081869 A1 | 10/2002 |

OTHER PUBLICATIONS

PCT/DE2008/001700, International Search Report, Feb. 16, 2009.

* cited by examiner

*Primary Examiner* — Michael Nghiem
(74) *Attorney, Agent, or Firm* — Howison & Arnott, L.L.P.

(57) ABSTRACT

The invention relates to a turbomachine having a rotor (10) comprising rotor blades (12), having a rotor housing (16) which surrounds at least sections of the rotor (10) or the rotor blade (12) so as to form a rotor gap (d), and having a gap-measuring system (18) which is coupled to a capacitive sensor device (20) having an electrode and a counterelectrode for determining measured capacitance values (C) which characterize the rotor gap (d), wherein the rotor (10) or the rotor blades (12) is/are connected as the electrode of the sensor device (20), wherein at least part (22) of the rotor housing (16) is connected as the counterelectrode. The invention also relates to a gap-measuring system (18) and to a method for determining a rotor gap (d) between a rotor (10) comprising rotor blades (12) and a rotor housing (16) of a turbomachine, which rotor housing surrounds at least sections of the rotor (10) or the rotor blades (12).

11 Claims, 1 Drawing Sheet

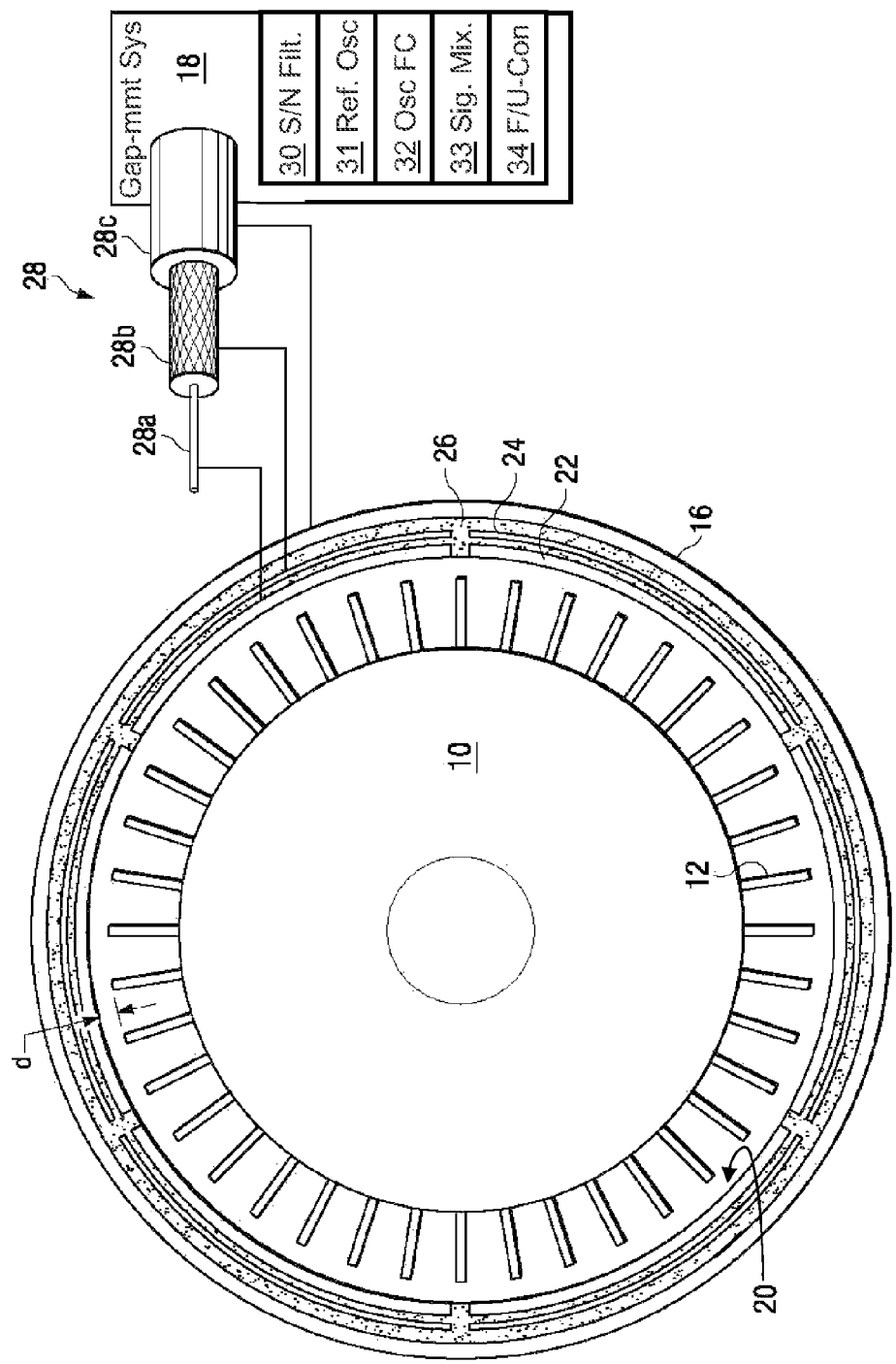

TURBOMACHINE, GAP-MEASURING SYSTEM, AND METHOD FOR DETERMINING A ROTOR GAP

CROSS-REFERENCE TO RELATED APPLICATIONS

This application is a U.S. National Phase application submitted under 35 U.S.C. §371 of Patent Cooperation Treaty application Ser. no. PCT/DE2008/001700, filed Oct. 17, 2008, and entitled TURBOMACHINE, GAP-MEASURING SYSTEM, AND METHOD FOR DETERMINING A ROTOR GAP, which application claims priority to German patent application serial no. 10 2007 051 027.8, filed Oct. 25, 2007, and entitled STROMUNGSMASCHINE, SPALT-MESSSYSTEM UND VERFAHREN ZUM ERMITTELN EINES ROTORSPALTES, the specifications of which are incorporated herein by reference in their entireties.

TECHNICAL FIELD

The invention concerns a turbine machine with a rotor comprising rotor blades, with a rotor housing surrounding at least in sections the rotor or the rotor blades, forming a rotor gap, as well as with a gap-measuring system of the type disclosed. The invention in addition concerns a gap-measuring system for determining a rotor gap of the type disclosed, as well as a method for determining a rotor gap of the type disclosed.

BACKGROUND

A turbine machine can be taken as already known from the prior art and includes at least a rotor provided with rotor blades and a rotor housing surrounding at least in sections the rotor or the rotor blades, forming a rotor gap. The efficiency and the pump behavior of the turbine machine are determined by the rotor gap between the tips of the rotor blades and the wall of the rotor housing surrounding the rotor or the rotor blades. This causes pressure drops, which reduce the efficiency and pump clearance distance. The rotor gap is also affected by centrifugal force and thermal effects, dependent upon rpm. While the diameter of the rotor or the rotor blades varies directly with centrifugal force, the rotor and the rotor housing react with different time constants to temperature changes in the medium flowing through the turbine machine. This leads to complex changes in the rotor gap as a function of the rotor rpm, temperature, and time. With turbine machines constructed as aircraft turbines, the smallest rotor gaps, for example, exist with the so-called "hot re-slams", in which a previously decelerated rotor is brought rapidly once more to maximum rpm after a short time. The rotor, still hot, thus has a thermally and centrifugal-force-conditioned maximum diameter, whereas the rotor housing, due to its lower thermal capacity, has already cooled off and is thus in a contracted state. Further factors influencing the rotor gap are, for instance, deformations of the rotor housing and radial motions of the rotor due to acceleration forces affecting the turbine machine. Altogether, therefore, in the construction of such turbine machines, a sufficiently large rotor gap must be maintained in the area of the rotor blade tips, for which reason the turbine machine mainly cannot operate at optimal efficiency and pump limiting distance. When testing turbine machines, the rotor gap therefore represents a central measurement value, so that turbine machines additionally include a gap-measuring system during testing in order to determine this rotor gap. What is more, the gap-measuring system is coupled to a capacitive sensor device, which has an electrode and a counterelectrode as capacitor for determining the measured capacitance values characterizing the rotor gap. In this, the rotor and its rotor blades are connected as an electrode of the sensor device. The counterelectrode of the capacitor is usually constructed as a sensor and is disposed inside the rotor housing. The measured capacitance values of the sensor device consequently change as the rotor blades run past it during operation, whereby the change in the measured capacitance values corresponds to the rotor gap. To measure the capacitance values, different electronic structural elements and methods are available to the expert, which operate using constant or alternating voltage and form the gap-measuring system. The gap-measuring system consequently receives a signal which changes frequency with the changing frequency of the blade, in which the amplitude stroke of each period corresponds to the minimum rotor gap of the blade passing under the sensor at that instant. The correlation between the amplitude stroke and the rotor gap is specified in advance by means of a calibration measurement and can be designed, for example, as a family of curves.

An alternative gap-measuring system or method known from the prior art operates with sensor devices which produce eddy currents in the rotor blades running past, which currents in turn react upon the sensor devices. The size of the effect is again dependent on the size of the rotor gap.

A further gap-measuring system or method known from the prior art operates with microwaves. Here the sensor device forms a resonator in the rotor housing, whose properties likewise change with the rotor blades running past and produce a measurement effect.

For all gap-measuring systems or methods, their use in series-produced turbine machines represents a far greater challenge than their use during testing of the turbine machines. Service lives of 10,000 hours or more are required, in which the sensor device must deliver reliable rotor-gap measurements. At the least, the sensor device is thus exposed, depending on the actual embodiment of the turbine machine, to varying temperatures up to 700° C., high pressures, oscillations, and further stresses due to water, salt, oil, dirt, metal abrasion, and the like.

A drawback of the known turbine machines or gap-measuring systems is therefore seen to be the fact that the counterelectrode of the sensor device must be arranged set back somewhat from the wall of the rotor housing that faces the rotor blades, so that in the event of a rotor-blade run-in, it will not be damaged. These setbacks are, however, undesirable because they lead to flow disruption. Alternatively, sensor devices based on eddy currents are known from the literature, which are designed so that they measure through the rotor housing against the rotor blades (so-called "through-the-case" sensors). For this, the rotor housing must be made thinner in the area of the sensor device. This method, though, leads to a considerable degradation of the measurement signal.

SUMMARY

It is thus a task of the present disclosure to describe a turbine machine and a gap-measuring system and a method for determining the rotor gap of such a turbine machine, which guarantees a long service life with high measurement accuracy, as well as reduced disruption of the flow through the rotor housing.

The task is resolved according to the invention by a turbine machine with the characteristics disclosed herein, a gap-measuring system for a turbine machine with the characteristics disclosed herein, and a method for determining a rotor gap with the characteristics disclosed herein. Advantageous embodiments are disclosed in the respective subclaims, in which the advantageous embodiments of the turbine machine and the gap-measuring system, insofar as applicable, are seen as advantageous embodiments of the method and vice versa.

A turbine machine, which exhibits a long service life and guarantees the determination of the rotation gap with high measurement accuracy and with reduced disruption of flow through the rotor housing, is created according to the invention in that at least a part of the rotor housing is connected as counterelectrode of the sensor device in the gap-measuring system. The sensor device of the gap-measuring system thus advantageously requires no additional sensor to serve as the counterelectrode inside the rotor housing. Rather, the function of the counterelectrode is assumed by the rotor housing itself, so that the measured capacitance values that can be determined are determined from the rotor housing and from the surfaces of all the rotor blade tips moving inside the rotor housing. In this way, in contrast to the prior art, no damage is done to the wall of the rotor housing facing the rotor or the rotor blades by pitting and the like, whereby a disruption-free throughflow of the respective medium is achieved in the turbine machine. Furthermore, the problems of the usual sensor devices caused by extreme operating conditions under varying temperatures, high pressures, oscillations, and contamination are reliably ruled out because the rotor housing has to withstand these operating conditions anyway. This makes increased measurement accuracy possible over the entire service life of the turbine machine. Additionally, because measurement here need not be by a sensor with a setback, measurement accuracy is significantly increased, since the size of the measured capacitance value is inversely proportional to the size of the rotor gap. Due to this smallest possible distance between electrode and counterelectrode, small changes in the rotor gap yield large changes in the measured capacitance value as a result. Because the rotor gap is determined directly here, no correction parameters for a setback of the counter electrode relative to the surface of the rotor housing need be considered. The capacitive measurement of the rotor gap is in addition further improved in that, in the event of a rotor blade run-in, a detectable short circuit occurs, so that a contact between rotor blades and rotor housing can be directly recorded. For this, in the event of a rotor blade run-in, the correct rotor gap is determined in addition, because the setback of the counterelectrode is not changed, as with individual sensors. Calibration of the measured capacitance values can thus occur, by way of example, on a turbine machine and can then be adopted for all further turbine machines. A further advantage lies in the fact that axial motions of the rotor relative to the rotor housing play no role, because the rotor blades are located with their entire span inside the rotor housing. An especially large measurement effect and a correspondingly high measurement accuracy are further ensured, in addition, in that the total surface of the tips of all the rotor blades is included at the same time in the measurement. Since, consequently, in contrast to the prior art, it is not just the surface area of one rotor blade that is located beneath a small individual sensor, the sensitivity of the capacitance measurement is multiplied.

In an advantageous embodiment of the invention it is provided that the rotor housing includes, on its wall that faces the rotor and the rotor blades, at least in sections at least one inner coating or liner which is made of a electrically conducting material and is connected as a counter-electrode. Since material can be abraded due to frictional contact between rotor blades and rotor housing, the arrangement of such an inner coating or liner in the area of potential contact between rotor blades and rotor housing represents an advantageous possibility for ensuring an individual running bed for the applicable turbine machine and therewith the smallest rotor gap possible, by "digging" the rotor blades into the inner coating. For this, the inner coating or the liner can be constructed as multilayered and consequently adjusted optimally to the respective operating conditions.

In a further advantageous embodiment of the invention, it is provided that between the inner coating or the liner and the rotor housing is disposed a cladding, which by means of insulation is insulated galvanically from the inner coating or the liner and the rotor housing. In this way, during the operation of the turbine machine, oscillations occurring between the inner coating or the liner and the rotor housing are at least significantly reduced or prevented entirely.

In a further embodiment, it has been shown to be advantageous for the gap-measuring system to be additionally coupled to the cladding and to be designed to determine measured capacitance values between the cladding and the rotor housing. By determining the measured capacitance values between the cladding and the rotor housing, deformation of the inner coating or the liner and/or of the rotor housing can additionally be detected and if necessary appropriate corrections can be made.

Further advantages result from the fact that the coupling between the gap-measuring system and the cladding and/or the rotor housing and/or the rotor and rotor blades and/or the inner coating or the liner is formed by a coaxial cable, especially a triaxial cable. This also ensures a cladding effect against disruptive electrical fields and the supply of operating current. In this way, both a high operational safety and a corresponding decrease in the spatial requirements and the weight of the gap-measuring system can be guaranteed. Additionally, the gap-measuring system can be executed coaxially or triaxially here, whereby signal disruptions, which originate due to oscillations of the coaxial cable or of the inner coating or the liner relative to the rotor housing, are at least stopped to a large extent. Corresponding electronic methods are known and described in the literature.

In a further advantageous embodiment it is provided that the rotor or the rotor blades and the rotor housing and/or the inner coating or the liner and the cladding each have the same potential. This enables an advantageous reduction in the required electrical contacts and a simplified configuration of the electronic evaluation system of the gap-measuring system.

In a further advantageous embodiment of the invention, it is provided that the inner coating or the liner is coupled to a central conductor, the cladding is coupled to an intercladding and the rotor and rotor blades, and the rotor housing are coupled to an outer cladding of the coaxial cable. This represents a structurally especially simple and space-saving possibility for determining both the measured capacitance values between the rotor and the inner coating and the measured capacitance values between the cladding and the rotor housing, and for therewith detecting the rotor gap as well as any possible deformation of the inner coating or the rotor housing. It is herein likewise seen as advantageous to execute the gap-measuring system triaxially, in order to stop signal disruptions at least to a large extent, which originate due to oscillations of the coaxial cable or of the inner coating or the liner relative to the rotor housing.

Thus it is furthermore seen as advantageous that the inner coating or the liner extends around the entire circumference of the wall of the rotor housing that faces the rotor and the rotor blades. In this way, the advantages already mentioned are ensured for the inner coating or the liner over the total inside circumference of the rotor housing.

In a further advantageous embodiment of the invention, it is provided that several inner coatings or liners are disposed as segments along the wall of the rotor housing that faces the rotor and the rotor blades. This offers the possibility of coupling the individual segments of the inner coating with a rotor-gap control module, which can, for instance, be gathered as known from WO 02/081869 A1 and, considering the rotor gap determined, of constructing an active regulating system, by means of which the inside diameter of the rotor housing can be adjusted as intended and accordingly further regulated.

In a further embodiment of the invention, it is provided that the several inner coatings or liners are insulated galvanically from one another. Thus several measured capacitance values localized over the circumference of the rotor can be determined, whereby several rotor-gap values are determined, and both a static determination of the radial rotor position relative to the rotor housing and also a dynamic determination of the rotor orbit are possible. The bandwidth of the gap-measuring system can thus be kept low, because no individual rotor blade need be removed. A few rounds at the rotational frequency are thus sufficient to determine the rotor orbit. Here it can be appropriately filtered highly and a correspondingly good signal-to-noise ratio achieved. The signal-to-noise ratio can be further improved by varying the upper limit of the signal-to-noise filter with the rotational frequency of the rotor.

A further aspect of the invention concerns a gap-measuring system for determining a rotor gap between a rotor comprising rotor blades and a rotor housing of a turbine machine surrounding this or the rotor blades at least in sections, in which it is provided, according to the invention, that at least a part of the rotor housing is connectable as a counterelectrode. In this way, a disruption-free throughflow of the respective medium is ensured in the related turbine machine, since, in contrast to the prior art, no damage is done to the wall of the rotor housing facing the rotor and rotor blades due to pitting and the like. For this, measurement must be done by a sensor with a setback, so that the measurement accuracy of the measured capacitance values, which are inversely proportional to the size of the rotor gap, is increased significantly. In addition, the gap-measuring system according to the invention makes a direct determination of a rotor blade run-in possible, since this leads to a short-circuit signal. Further resultant advantages may be gathered from the preceding descriptions of the turbine machine and are valid, insofar as applicable, for the gap-measuring system and vice versa.

Thus, it has been shown as advantageous that the gap-measuring system includes a reference oscillator with a constant frequency and/or an oscillator with a frequency corresponding to the measured capacitance values and/or a signal mixer and/or an F/U converter and/or a signal-to-noise filter. This makes an especially flexible embodiment of the gap-measuring system possible, depending on the respective constructional demands and conditions.

Further advantages result thereby, that the gap-measuring system is configured to operate at several frequencies, preferably 10 kHz and 100 kHz and 1 MHz, simultaneously. Additional information, such as, for example, insulation resistance, can hereby be determined and the measurement accuracy of the gap-measuring system can be raised further.

The signal-to-noise ratio of the measured capacitance values and therewith the measurement accuracy of the gap-measuring system can be raised advantageously if the gap-measuring system is configured to filter the measured capacitance values depending on the rotational frequency of the rotor.

A further aspect of the invention concerns a method for determining a rotor gap between a rotor including rotor blades and a rotor housing of a turbine machine surrounding the rotor and rotor blades at least in sections in which, according to the invention, it is provided that at least a part of the rotor housing is connected as a counterelectrode. This makes possible a reduced disruption of flow through the rotor housing of the turbine machine with a simultaneously high measurement accuracy. Further resultant advantages may be gathered from the descriptions already presented.

In an advantageous embodiment of the invention, it is provided that at least one inner coating or liner, which is made of an electrically conducting material, is connected as a counterelectrode, which is disposed at least in sections on the wall that surrounds/faces the rotor and the rotor blades and is insulated galvanically from the rotor housing. Such an inner coating or liner allows an advantageous reduction in wear at the rotor-blade tips. Due to the adjustability of the material used, the measurement accuracy and service life of the gap-measuring system can be raised further here.

In this it is further shown to be advantageous that using the measured capacitance values of several inner coatings or liners, which were previously disposed as segments and insulated galvanically from one another along the wall of the rotor housing that faces the rotor and rotor blades, the static and/or dynamic angular position of the rotor relative to the rotor housing is determined. This makes a determination of the static rotor position relative to the rotor housing and/or the dynamic rotor orbit possible, using the localized measured capacitance values.

Further advantages result from using the measured capacitance values of the several inner coatings or liners, which were previously disposed as segments and galvanically insulated from one another along the wall of the rotor housing that faces the rotor and rotor blades, to determine the rotor gap over the inside circumference of the rotor housing. This makes possible, in particular in connection with an active gap-maintaining system, a controlled adjustability of the inside diameter of the rotor housing.

A further improvement of the measurement accuracy is achieved in that an upper limit for a signal-to-noise filter of the gap-measuring system is adjusted based on the rpm of the rotor or rotor blades.

BRIEF DESCRIPTION OF THE DRAWINGS

Further advantages, characteristics, and particularities of the invention result using the following description of an embodiment example and using the drawing.

The FIGURE shows a schematic and frontal sectional view of a turbine machine built as a turbine, according to an embodiment example.

DETAILED DESCRIPTION

Referring now to the FIGURE, in which identical or functionally identical elements are provided with identical reference numbers, shows a schematic and frontal sectional view of the present embodiment example as a turbine machine built as a turbine. The turbine machine thus includes a rotor 10 with a plurality of rotor blades 12, which are surrounded, with the formation of a rotor gap d, by a rotor housing 16. For determining the measured capacitance values characterizing the rotor gap d, the turbine machine further includes a gap-measuring system 18, which is coupled to a capacitive sensor device 20. Thus the rotor 10 and the rotor blades 12 are connected as an electrode and a part of the rotor housing 16 as a counterelectrode of the sensor device 20, and consequently form a capacitor, whose capacitance value(s) C, according to the general capacitor formula $C=\epsilon_0 * \epsilon_r * A/d$, correspond to the size of the rotor gap d. The rotor housing 16 includes, on its wall that faces the rotor 10 and rotor blades 12, several inner coatings or liners 22, which are made of an electrically conducting material and represent the part of the rotor housing 16 serving as the counterelectrode. The inner coatings or liners 22 are distributed as segments over the inside circumference of the rotor housing 16 and are insulated galvanically from one another by means of insulation 26. To reduce oscillations occurring during the operation of the turbine machine claddings 24 are disposed between the inner coatings or liners 22 and the rotor housing 16, which are in turn galvanically insulated by means of insulation 26 from both the inner coatings or liners 22 and from the rotor housing 16. It may be stressed here, however, that the inner coatings or liners 22 shown need not absolutely exist, and measurement can also be performed directly against the rotor housing 16.

The gap-measuring system 18 is coupled by means of a triaxial cable 28 to the cladding 24, to the rotor housing 16, to the rotor 10 and rotor blades 12, and to the inner coatings or liners 22. Thus the inner coatings or liners 22 lie on a central conductor 28a, the cladding 24 is coupled to an intercladding 28b and the rotor 10 or the rotor blades 12 and the rotor housing 16 are coupled to an outer cladding 28c of the triaxial cable 28, whereby the rotor 10 or rotor blades 12 and the rotor housing 16 as well as the inner coatings or liners 22 and the cladding 24 each have the same potential. The rotor 10 or rotor blades 12 and the rotor housing 16 lie preferably at the same ground potential. In this way, both the measured capacitance values C that characterize the rotor gap d between the rotor 10 or the rotor blades 12 and the rotor housing 16, as well as measured capacitance values C' that characterize possible deformations of the rotor housing 16 or the inner coatings or liners 22 can be determined and if necessary appropriate corrections can be made. Since in practice the total inside surface A of the inner coatings or liners 22 of the rotor housing 16, which surfaces faces the rotor blades 12, acts as a counterelectrode of the sensor device 20, exact measured capacitance values C with a good signal-to-noise ratio can be determined according to $C=\epsilon_0 * \epsilon_r * A/d$. The signal-to-noise ratio is additionally raised by changing an upper limit of a signal-to-noise filter 30 of the gap-measuring system with the rotational frequency of the rotor 10. A reference oscillator 31 with a constant frequency and/or an oscillator 32 with a frequency corresponding to the measured capacitance values and/or a signal mixer 33 and/or an F/U-converter 34 (i.e., a F/V-converter) may be operatively connected to the capacitive sensor device 20 along with, or instead of, the signal-to-noise filter 30. By the use of the segmented inner coatings or liners 22, by considering the individual measured capacitance values C, the relative position of the rotor 10 relative to the rotor housing 16 can be determined or the rotor orbit determined. In addition, the bandwidth of the gap-measuring system 18 can be kept low, since no individual rotor blades 12 need be removed. A few rounds at the rotational frequency of the rotor 10 are sufficient here to determine the rotor orbit. Accordingly, this makes it possible to highly filter, by means of a signal-to-noise filter 30, whereby the signal-to-noise ratio is raised further. The gap-measuring system 18 can advantageously operate at several carrier frequencies, in particular 10 kHz, 100 kHz, and 1 MHz, whereby, in addition to a further increase in measurement accuracy, additional information such as, for instance, insulation resistance and the like is accessible.

The invention claimed is:

1. A turbine machine comprising:
    a rotor having a plurality of rotor blades;
    a rotor housing surrounding the rotor and the rotor blades and thereby defining a rotor gap d therebetween at least in sections;
    a gap measuring system operatively connected to a capacitive sensor device for determining of the measured capacitance values characterized by the rotor gap d;
    the capacitive sensor device including an electrode and a counterelectrode;
    wherein the rotor and the rotor blades are connected as the electrode of the sensor device; and
    wherein at least one part of the rotor housing is connected as the counterelectrode;
    wherein the rotor housing further includes at least one inner coating or liner made of an electrically conducting material that is disposed on a wall of the rotor housing facing the rotor and the rotor blades at least in segments and said at least one inner coating or liner is connected as the counterelectrode; and
    a cladding disposed between the inner coating or the liner and the rotor housing, the cladding being galvanically insulated from the inner coating or liner and the rotor housing by insulation; and
    wherein the gap-measuring system is additionally coupled to the cladding and is designed to determine the capacitance values C between the cladding and the rotor housing.

2. A turbine machine according to claim 1, wherein the coupling is formed between the gap-measuring system and at least one of the cladding, the rotor housing, the rotor, the rotor blades and the inner coating or liner by one of a coaxial cable and a triaxial cable.

3. A turbine machine according to claim 2, wherein:
    the inner coating or liner is coupled to a central conductor of the cable;
    the cladding is coupled to an intercladding of the cable and to the rotor or the rotor blades; and
    the rotor housing is coupled to an outer cladding of the cable.

4. A turbine machine according to claim 1, wherein at least one of the rotor and the rotor blades has the same potential as the rotor housing and/or the inner coating or liner and the cladding have the same potential.

5. A turbine machine according to claim 1, wherein the inner coating or the liner stretches to its full extent along the wall of the rotor housing facing the rotor or the rotor blades.

6. A turbine machine according to claim 1, wherein several inner coatings or liners are disposed as segments along the wall of the rotor housing facing the rotor or the rotor blades.

7. A turbine machine according to claim 6, wherein the several inner coatings or liners are insulated galvanically from one another.

8. A method for determining a rotor gap d between rotor blades of a rotor and a rotor housing of a turbine machine surrounding the rotor blades at least in sections, the method comprising the following steps:
    coupling a gap-measuring system to at least one capacitive sensor device measuring the capacitance values C determined by the rotor gap d;
    wherein the rotor or the rotor blades are connected as the electrode of the sensor device, and wherein at least a part of the rotor housing is connected as the counterelectrode of the sensor device; and connecting at least one inner coating or liner made of an electrically conducting material as the counterelectrode that is disposed at least in segments on a wall of the rotor housing facing the rotor or the rotor blades and said at least one inner coating or liner is insulated galvanically from the rotor housing.

9. A method according to claim 8, further comprising using the measured capacitance values C of several inner coatings or liners that are insulated galvanically from one another and that were previously disposed as segments along the wall of the rotor housing facing the rotor and the rotor blades to determine the static and/or dynamic angular position of the rotor relative to the rotor housing.

10. A method according to claim 8, further comprising using the measured capacitance values C of several inner coatings or liners that are insulated galvanically from one another and that were previously disposed as segments along the wall of the rotor housing facing the rotor and the rotor blades to determine the rotor gap d over the inside circumference of the rotor housing.

11. A method according to claim 8, wherein the gap-measuring system further includes a signal-to-noise filter, and an upper limit for the signal-to-noise filter is adjusted depending on the rpm of the rotor or rotor blades.

\* \* \* \* \*